US012561152B2

(12) United States Patent
Whitmore et al.

(10) Patent No.: US 12,561,152 B2
(45) Date of Patent: Feb. 24, 2026

(54) METHODS AND SYSTEMS FOR ADAPTIVE CONFIGURATION

(71) Applicant: Capital One Services, LLC, McLean, VA (US)

(72) Inventors: Jon Whitmore, Washington, DC (US); Lucas Rozier, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 113 days.

(21) Appl. No.: 18/464,915

(22) Filed: Sep. 11, 2023

(65) Prior Publication Data

US 2025/0085991 A1　　Mar. 13, 2025

(51) Int. Cl.
| | |
|---|---|
| *G06F 9/451* | (2018.01) |
| *G06Q 20/32* | (2012.01) |
| *G06Q 20/38* | (2012.01) |
| *H04W 4/02* | (2018.01) |

(52) U.S. Cl.
CPC ......... *G06F 9/454* (2018.02); *G06Q 20/3278* (2013.01); *G06Q 20/3821* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 2013/0132067 A1* | 5/2013 | Gelbman ............... | G06Q 40/00 704/8 |
| 2016/0086020 A1* | 3/2016 | Bigos .................... | G06V 10/42 715/703 |
| 2016/0088089 A1* | 3/2016 | Migdalovich ......... | H04L 67/125 709/204 |
| 2016/0162855 A1* | 6/2016 | Johnson ............... | G06Q 20/405 705/43 |
| 2017/0185980 A1* | 6/2017 | Wurmfeld .......... | G06Q 20/1085 |
| 2018/0097926 A1* | 4/2018 | Osman .................. | G06F 9/4451 |
| 2020/0043495 A1* | 2/2020 | Park ....................... | G10L 15/25 |
| 2021/0081913 A1* | 3/2021 | Benkreira ............... | G06N 5/02 |

* cited by examiner

*Primary Examiner* — Christopher J Fibbi
(74) *Attorney, Agent, or Firm* — Foley & Lardner LLP

(57)　　ABSTRACT

Systems and methods for adaptive configuration. In some aspects, a system may receive an indication that a communication session is initiated between a public terminal and a user device in proximity of the public terminal. In response to receiving the indication, the system may obtain historical transaction data of the user. Based on the historical transaction data, the system may determine (1) frequent locations of the user where a user has conducted more than a threshold number of transactions and (2) a language preference for the user. In response to determining that the user is not located within one or more frequent locations of the user, the system may transmit a command to alter a digital display of the public terminal based on a user-specific configuration, wherein the user-specific configuration comprises the language preference of the user.

20 Claims, 6 Drawing Sheets

METHODS AND SYSTEMS FOR ADAPTIVE CONFIGURATION

SUMMARY

Travel to new destinations can bring unexpected issues in many cases. For example, employees may travel for business reasons such as to attend meetings or conferences, students may travel for study abroad programs, and patients may travel to other countries for medical treatments that are not available in their home countries. In each case, individuals often find themselves in regions where they do not understand the language that is prevalent in the country. In sensitive cases, such as where a user's personal or financial information is involved, lacking an understanding of the language in which transactions are conducted can prove problematic.

For example, using public terminals such as a self-service kiosk for passport or visa processing, ticket vending machines for trains, health clinic or hospitals' self-check-in machines, and/or automatic teller machines (ATMs) in languages a user does not understand may result in incorrect transactions and potential financial losses. Further, this can also create security concerns, as users may not understand the prompts for confirming transactions or safeguarding their personal or financial information, which in turn may lead to vulnerability to fraudulent activity. In situations where quick and accurate transactions are necessary, such as during an emergency, lacking an understanding of the languages used at public terminals can pose a danger.

Accordingly, among other things, a mechanism is desired where a public terminal is adaptively configurable for each user. For example, based on determining that a user is not within one or more frequent locations for the user, the public terminal may be adapted to display information based on a language preference of the user determined using past interactions at other public terminals.

In some aspects, a method for adaptive configuration of a display language of a public terminal is described. For example, a method may include receiving an indication that a communication session is initiated, using near field communication (NFC), between a public terminal at a first location and a user device of a user in proximity of the public terminal. In response to receiving the indication, the method may include obtaining historical transaction data of the user. For example, historical transaction data might include (1) a plurality of transactions of the user, (2) a plurality of corresponding locations where the plurality of transactions occurred, and (3) a plurality of corresponding languages in which the plurality of transactions occurred.

Based on the historical transaction data, (1) one or more frequent locations of the user where the user has conducted more than a threshold number of transactions and (2) a language preference for the user in which the user has conducted a highest number of transactions may be determined. In some examples, determining, based on the historical transaction data, the language preference for the user includes determining, from the historical transaction data of the user, one or more public terminals used by the user in previous transactions; and determining, a language associated with a location of the public terminal that the user uses with highest frequency.

It may also be determined whether the user of the user device is located within the one or more frequent locations of the user. In response to determining that the user is not located within the one or more frequent locations of the user, a command may be transmitted to alter a digital display of the public terminal based on a user-specific configuration, wherein the user-specific configuration comprises the language preference of the user. In response to an indication that the communication session has ended, the public terminal may be reconfigured.

In some examples, the method further includes requesting, via the digital display of the public terminal in the user-specific configuration, user authentication data. The method may include receiving, from the public terminal, the user authentication data received at the public terminal. The user authentication data may be compared with stored credentials of the user, and in response to determining that the user authentication data matches the stored credentials of the user, transmitting an indication of a successful authentication of the user to the public terminal. In some examples, the method may include receiving an indication of successful performance of an action at the public terminal by the user and transmitting, to the user device, a notification indicating that the action has been completed.

In some examples, the method includes determining that the language preference for the user in which the user has conducted the highest number of transactions is unavailable at the public terminal and determining an alternative language with which to alter a digital display of the public terminal.

In some examples, further comprising determining, based on the historical transaction data, one or more actions routinely performed at the public terminal by the user; and transmitting a command to adaptively alter the digital display of the public terminal to suggest options for performing the one or more actions. For example, the one or more actions performed at the public terminal may be actions performed more than a threshold number of times during a time frame.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, travel to new destinations occurs in many cases, such as for business, for studying, for medical treatments, etc. Individuals often find themselves in countries where they do not understand the language. In some cases, such as where a user's personal or financial information is involved, lacking an understanding of the local language can be problematic for many reasons. Not understanding the language at a public terminal, such as a self-service kiosk for passport or visa processing, ticket vending machines for trains, health clinic or hospitals' self-check-in machines may result in incorrect results from misinformation. For example, this could lead to incorrect transactions, potential financial losses, wrong medical care, etc.

Accordingly, among other things, a mechanism is desired where a public terminal is adaptively configurable for a given user. For example, based on determining that a user is not in one or more frequent locations for the user, the public terminal may be adapted to display information based on a language preference of the user determined by using past interactions at other public terminals (e.g., languages selected/used at other kiosks, etc.).

Figure 1:
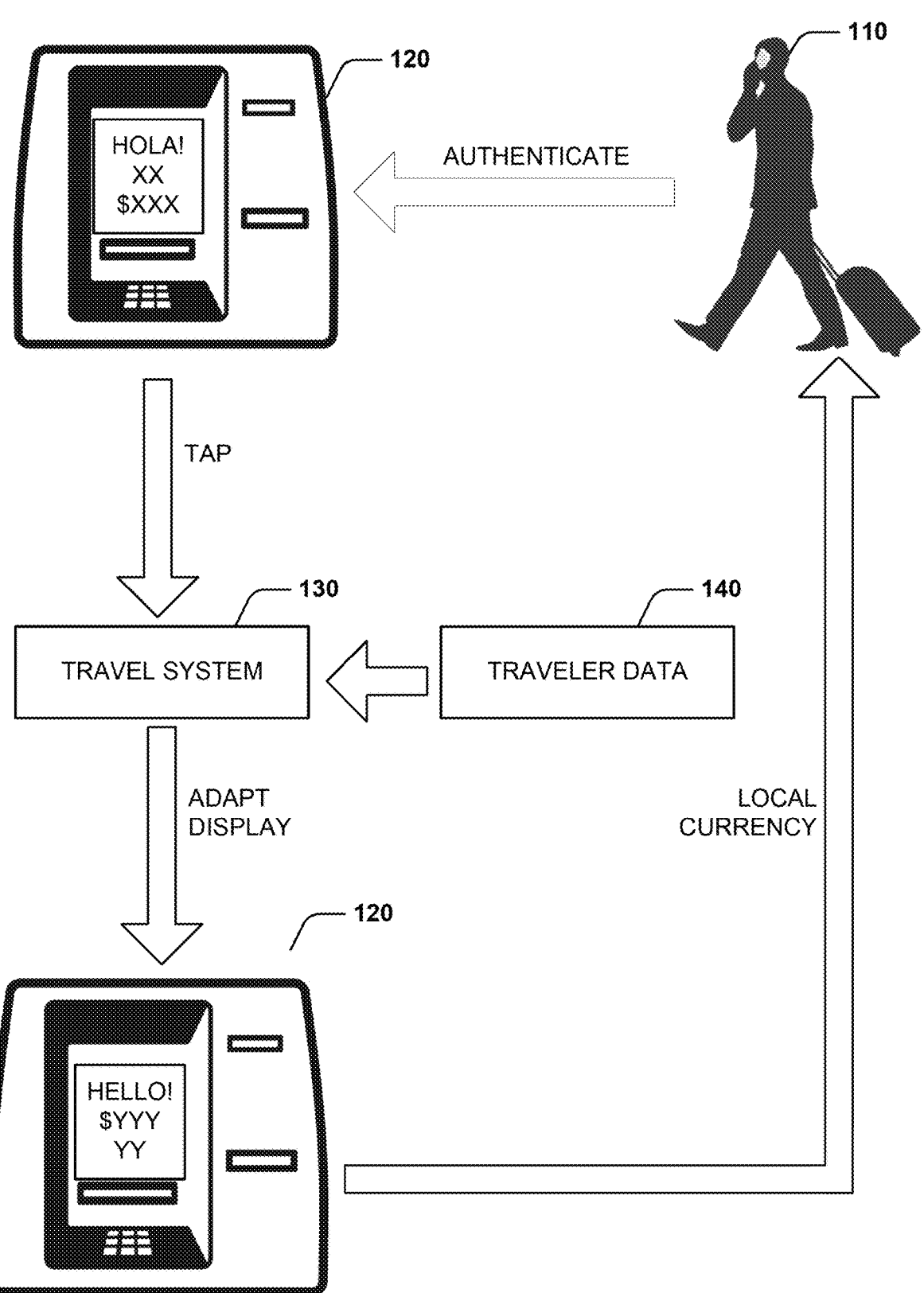
FIG. 1 illustrates a high-level diagram of aspects of the subject disclosure, in accordance with one or more embodiments described herein.

FIG. 1 illustrates a high-level view of the subject disclosure according to aspects herein. A user 110, such as a traveler, can travel from their home country, country of residence, country of employment, or the like to a country where they do not speak the language. For example, the user 110 may have traveled from the United States to Spain, where they do not know or speak the language of the foreign country. After arriving in the foreign country, the user 110 may seek to perform one or more operations, such as obtaining physical currency or cash from a public terminal, such as an automated teller machine (ATM) 120. As described herein, a public terminal may refer to a computer or kiosk that is available for use by the general public, or a large portion of the public. Public terminals may be located in public spaces such as libraries, shopping centers, airports, and train stations. A public terminal may include a communication module, capable of communicating to and from a remote device, such as a server, e.g., via wired and/or wireless connection.

The user 110 can approach the ATM 120 with the user device. The ATM 120 provides a user interface through which users can operate to receive physical currency or cash. The ATM 120 provides the user interface in a language commonly spoken in the foreign country or area where the ATM 120 is located. For example, an ATM 120 that resides in Barcelona can present the user interface on a display screen of the ATM 120 in Spanish, the commonly spoken language of Barcelona, Spain. The information presented on the ATM 120 can be different letters, numbers, words, phrases, buttons, and/or the like that can be common or customary for the foreign country or common user preferences of users living in the foreign country.

The user 110 can interact with the ATM 120 in a manner that invokes the travel system 130. For example, the user 110 may initiate a communication session between the user device and the public terminal. In one instance, the interaction can correspond to a wireless tap at a specific location on the ATM 120 with a mobile device, which can result in transmission of mobile device input to the ATM 120. The ATM 120 can include a receiver located on or within the ATM 120. The receiver of the ATM 120 can include a radio frequency identifier (RFID), near field communication (NFC), Wi-Fi, Bluetooth, and/or the like. The ATM 120 can receive a tap or connection input from the mobile device.

For example, the user 110 may bring their user device within a certain proximity of the public terminal. The public terminal may detect the presence of the user device (e.g., using a near field communication (NFC) reader). The ATM 120 or the user device may transmit an indication that a communication session is initiated. The travel system 130 may receive an indication that a communication session is initiated, using near field communication (NFC), between the public terminal at a first location and a user device of a user in proximity of the public terminal.

In response to receiving the indication, the travel system 130 may obtain historical transaction data of the user. For example, historical transaction data can be data regarding any previous interactions a user had at a public terminal. For example, historical transaction data may include a plurality of transactions of the user, a plurality of corresponding locations where the plurality of transactions occurred, and a plurality of corresponding languages in which the plurality of transactions occurred.

For example, the ATM 120 can receive input from a mobile device associated with the user 110. In some embodiments, the mobile device input can be a wireless tap received at a specified location on the ATM. In some embodiments, the ATM 120 can prompt the user 110 to tap the mobile device associated with the user 110 to a receiver located on or within the ATM 120. The receiver of the ATM 120 can include a radio frequency identifier RFID, near field communication NFC, Wi-Fi, Bluetooth, and/or the like. The ATM 120 can receive a tap or connection input from the mobile device.

Based on the tap, a travel system 130 can receive, determine, or be provided a profile of the user 110. The travel system 130 can provide the profile to the ATM 120 from different sources of traveler data 140. The traveler data 140 can provide or store the profile of the user 110 on a mobile device, over a network cloud, a financial institution, internet, system interface with a financial account associated with the user 110, and/or the like. The traveler data 140 may include the historical transaction data of the user.

In some embodiments, the profile of the user 110 can be a language preference. The ATM 120, after receiving the tap and/or the profile, can present an adapted or altered view generated by the travel system 130. The travel system 130 can alter a digital display of the ATM based on the mobile device input. The digital display is changed to a preselected language setting/preference, a learned language setting/preference, or the like.

In some embodiments, the travel system 130 can determine if an altered view is desired or needed for the user 110. The travel system 130 can determine if or when the user 110 is traveling internationally in a country that the user 110 does not know the language. The travel system 130 can determine the user 110 is outside their country of residence. The travel system 130 can perform data mining of the traveler data 140 to retrieve data associated with the user 110 from one or more data sources to determine if the user 110 is attempting to withdraw money in a foreign country. The travel system 130 can determine the likelihood that the traveler is outside their country of residence based on the traveler data 140. The travel system 130 can access one or more data sources such as an email, a calendar entry, location data of the mobile device, a travel itinerary, text messages, correspondence, and/or the like. For example, the travel system 130 can read or interpret email data of an email account associated with the user 110 to find a travel itinerary for the user 110. The travel system 130 can determine that the user 110 is in a foreign country based on analyzing the travel itinerary.

In some examples, the travel system 130 may determine, based on the historical transaction data, one or more frequent locations of the user where the user has conducted more than a threshold number of transactions and/or a language preference for the user in which the user has conducted a highest number of transactions. Using this data, the travel system 130 may determine whether the user of the user device is located within the one or more frequent locations of the user. For example, the travel system 130 may compare the locations listed in the traveler data 140 to a current location of the public terminal.

In some examples, rather than determining the preferred language based on the language a user used in a highest number of transactions, the travel system 130 may determine, from the historical transaction data of the user, one or more public terminals used by the user in previous transactions, such as a public terminal used with the most frequency, or for the most transactions, and then determine a language associated with the location of that public terminal.

In response to determining that the user is not located within the one or more frequent locations of the user, the system may transmit a command to alter a digital display of the public terminal based on a user-specific configuration, wherein the user-specific configuration comprises the language preference of the user. In examples, where the preferred language is not available, e.g., when travel system 130 determines that the language preference for the user in which the user has conducted the highest number of transactions is unavailable at the public terminal, the system may determine an alternative language with which to alter a digital display of the public terminal.

The travel system 130 can generate an altered view to be presented on the ATM 120 to the user 110. In some embodiments, the travel system 130 alters the view to be in a language(s) that the user 110 understands. In other embodiments, the travel system 130 can generate a view based on learned behavior of the user 110. For example, the travel system 130 can determine that the user 110 prefers to withdraw a specific amount of currency. The travel system 130 can display a quick withdrawal button for the specific amount of currency. In some embodiments, the travel system 130 can analyze historical data of previous traveler interactions with ATMs to determine the most used buttons, features, amounts, or the like. The travel system 130 can arrange icons on the view according to the captured most used buttons.

According to some examples, the travel system 130 determines, based on the historical transaction data, one or more actions routinely performed at the public terminal by the user. The travel system may transmit a command to adaptively alter the digital display of the public terminal to suggest options for performing the one or more actions. For example, if the travel system 130 finds that on a weekly or biweekly basis that the user deposits $40, the travel system may transmit a command to adaptively alter the digital display to suggest an option for depositing $40. In some examples, determining the one or more actions comprises determining, from the plurality of transactions, e.g., historical transactions, of the user, one or more actions performed at the public terminal more than a threshold number of times during a time frame.

After the ATM is transitioned to a preferred language of the traveler, further information can be requested and input to authenticate the user 110 to enable access to an account with a financial institution to withdraw physical currency. In one instance, the ATM 120 can request input of a personal identification number (PIN). The PIN, in combination with further information associated with a mobile device or physical card, can be employed to authenticate the traveler's identity. In another embodiment, the user 110 can initiate a withdrawal by inserting a debit card into a slot of the ATM 120 and providing a personal identification number (PIN) to authenticate the user 110. It is appreciated that there are many ways for the user 110 to authenticate themselves with the ATM 120, including but not limited to one-time passcode, wireless communication (e.g., via taps), token exchange, mobile interface, or the like.

For example, travel system 130 may request, via the digital display of the public terminal in the user-specific configuration, user authentication data (e.g., PIN, etc.). The travel system 130 may then receive, from the public terminal, the user authentication data received at the public terminal. The travel system may compare the user authentication data with stored credentials of the user and in response to determining that the user authentication data matches the stored credentials of the user, transmitting an indication of a successful authentication of the user to the public terminal, e.g., such that the user may continue to perform operations at the terminal. In some examples, the user authentication data and stored credentials may be encrypted.

In some examples, the travel system 130 may receive an indication of successful performance of an action at the public terminal by the user and transmit, to the user device, a notification indicating that the action has been completed.

In some embodiments, travel system 130 can determine business rules for the user 110 based on a business that employs the user 110. The travel system 130 can adapt the view displayed on the ATM 120 based on the determined business rules. The travel system 130 can train a business rule model based on historical transaction data associated with a business that employs the traveler. The travel system 130 can invoke the business rule model to determine the digital display of the ATM 120 based on the business rule model. In some embodiments, the travel system 130 determines trends of the historical transaction data of other business employees as a training data set. The travel system 130 may train the business rule model via a machine learning technique. For example, the travel system 130 can determine the business rule model that outputs a per diem business rule based on historical withdrawals by employees. The travel system 130 can generate a view to display on the ATM 120 to suggest a withdrawal amount based on the per diem business rule. For example, a learned per diem business can be a $100 per diem for food expenditures. The travel system 130 can arrange a fast withdrawal button to be displayed to the user 110 on the ATM 120.

According to some examples, in response to an indication that the communication session has ended, the public terminal may be reconfigured, e.g., so as to revert back to the language or configuration associated with the local area.

Figure 2:
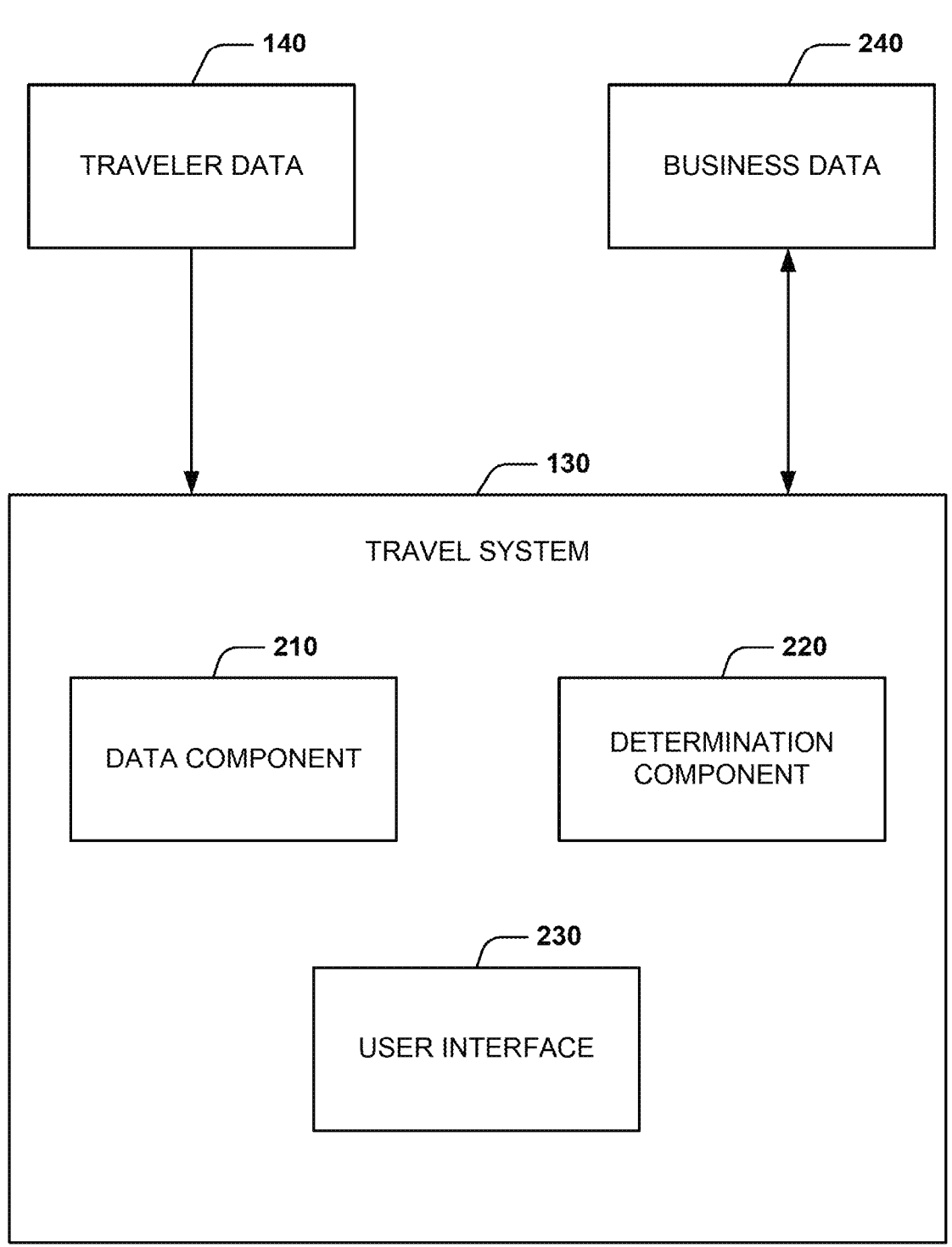
FIG. 2 illustrates an example component diagram of a travel system, in accordance with one or more embodiments described herein.

FIG. 2 illustrates a detailed component diagram of the travel system 130. The travel system 130 can be integrated with an ATM 120 or be remote of the ATM 120 and interfaced with the ATM 120 to provide and receive data and/or views for display. The travel system 130 includes a data component 210, a determination component 220, and a user interface 230. The data component 210 can be executed by a hardware processor, software application, a combination thereof, and/or the like. Upon receiving a mobile tap at the ATM 120, the data component 210 can access the traveler data 140. The data component 210 can receive a profile of the user 110 from the traveler data 140. The data component 210 can provide the profile to the ATM 120 from different sources of traveler data 140. The data component 210 can provide or store the profile of the user 110 on the mobile device, over a network cloud, a financial institution, internet, system interface with a financial account associated with the user 110, or the like.

In some embodiments, the determination component 220 can create a profile of the user 110 from the traveler data 140 to store with the data component 210. For example, the data component 210 can receive an address associated with the user 110. The determination component 220 can determine a language preference of the user 110 to store in the profile based on the address location. In other embodiments, the determination component 220 can receive a social media profile associated with the user 110 from the data component 210. The determination component 220 can analyze the social media data (e.g., social media post written by the user 110) to determine a language that the user 110 understands.

In some embodiments, the determination component 220 can determine if an altered view is desired or needed for the user 110. The determination component 220 can determine if or when the user 110 is traveling internationally in a country that the user 110 does not know the language. The determination component 220 can determine the user 110 is outside their country of residence. The data component 210 can perform data mining of the traveler data 140 to retrieve data associated with the user 110 from one or more data sources.

The determination component 220 can determine if the user 110 is attempting to withdraw money in a foreign country. In some embodiments, the determination component 220 can determine the likelihood that the traveler is outside their country of residence based on the traveler data 140. The data component 210 can access one or more data sources such as an email account, social media data, metadata, audio/visual data, a calendar, location data of the mobile device, a travel itinerary, text messages, correspondence, and/or the like. For example, the determination component 220 can analyze metadata associated with image data on the mobile device of the user 110 to determine location metadata (e.g., a location tag). The determination component 220 can determine that the user 110 is in a foreign country based on analyzing the metadata.

In some embodiments, the determination component 220 can determine business rules for the user 110 based on a business at which the user 110 is employed. The determination component 220 can receive business data 240. The determination component 220 can access the business data 240 via a network, application programming interface API, and/or the like. The business data 240 can be human resources data, best practices data, an employee handbook, training materials, historical data, employee account data, historical expenditure or expense reports, accounting data, or the like.

The determination component 220 can train a business rule model based on the business data 240 associated with the business that employs the traveler. The travel system 130 can invoke the business rule model to determine information displayed on the ATM 120 based on the business rule model. In some embodiments, the determination component 220 determines trends of the historical expense reports of other business employees as a training data set. The determination component 220 may train the business rule model via a machine learning technique. For example, the determination component 220 can determine the business rule model that outputs an expense rule based on historical expense reports. The determination component 220 can suggest a withdrawal amount based on the expense rule. For example, a learned business expense can be a $50 expense limit for transportation expenditures. The determination component 220 can recommend a fast withdrawal button to be displayed to the user 110 on the ATM 120.

The travel system 130 can include a user interface 230. The user interface 230 can generate an adapted or altered view that is displayed or presented by the ATM 120. The user interface 230 can alter a digital display of the ATM based on the mobile device input. The user interface 230 can change the digital display based on a preselected language setting/preference, a learned language setting/preference, and/or the like.

The user interface 230 can generate an altered view to be presented on the ATM 120 to the user 110. In some embodiments, the user interface 230 alters the view to be in a language(s) that the user 110 understands. In other embodiments, the user interface 230 can generate a view based on learned behavior of the user 110. For example, the user interface 230 can determine that the user 110 prefers to withdraw a specific amount of currency. The user interface 230 can display a quick withdrawal button for the specific amount of currency. In some embodiments, the user interface 230 can arrange the views on the ATM 120 based on historical data of previous traveler interactions with ATMs to determine the most used buttons, features, amounts, and/or the like. For example, the user interface 230 can arrange icons on the view according to the captured most used buttons specific to the user 110. The user interface 230 can adapt a view displayed on the ATM 120 based on the determined business rules. For example, the user interface 230 can suggest amounts equivalent to expenditure limits of the business provided to the user 110. In some embodiments, the user interface 230 can display a warning to the traveler when a user 110 requests a withdrawal amount that exceeds an expenditure limit. For example, if the user 110 requests $200 when a daily expenditure rule is $100, the user interface 230 can generate and display an alert in real time or near real time to the user 110 that the requested amount exceeds the rule.

Figure 3:
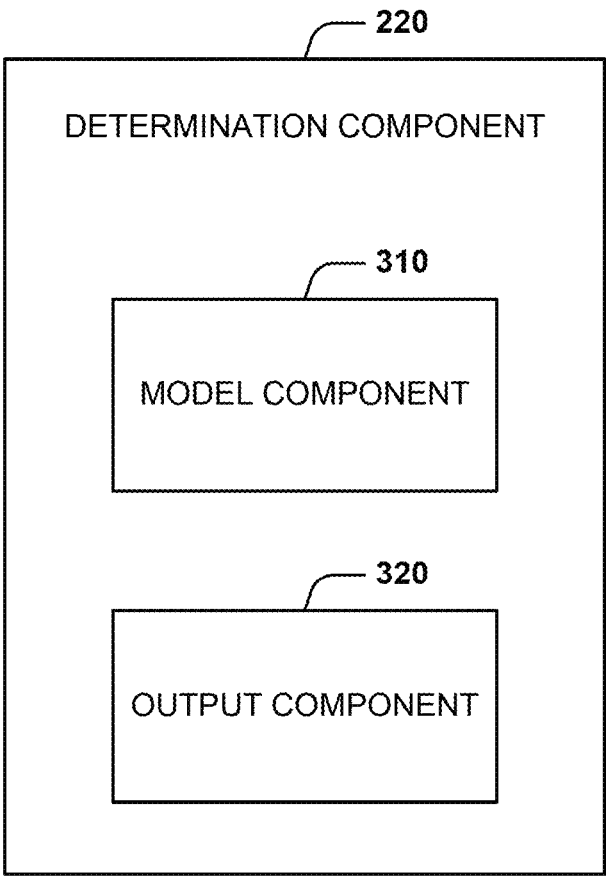
FIG. 3 illustrates an example component diagram of a determination component, in accordance with one or more embodiments described herein.

FIG. 3 illustrates a detailed component diagram of the determination component 220. The determination component 220 includes a model component 310. The model component 310 can train a prediction model that can predict a traveler's (e.g., user 110) selections at an ATM 120 while traveling internationally. The model component 310 can train the prediction model via historical traveler data as a training dataset. An output component 320 can invoke the prediction model to determine the likelihood that the traveler is outside their country of residence based on the traveler data 140. The output component 320 can further predict an arrangement of buttons, icons, settings, and/or the like to be displayed on the ATM 120 to the user 110.

The model component 310 can train the prediction model via historical interactions of the user 110 via the machine learning technique. The model component 310 can utilize a machine learning technique to determine trends between historical interactions of the user 110 or other international travelers. The model component 310 learns from existing data to make predictions about the selections the user 110 may make with the ATM. The model component 310 builds the prediction model from historical data (e.g., "training data set") to make data-driven predictions or decisions expressed as outputs or assessments for the user 110. The model component 310 can determine the trends and/or correlations within the historical interaction data. For example, the prediction model can factor in a usual withdrawal amount, time of day of withdrawal, location of withdrawal, and/or the like. In some embodiments, the model component 310 utilizes the machine learning technique to analyze the historical interactions across different users or financial institutions and/or the like to determine a prediction model based on correlations in the history from the financial institution.

In some embodiments, the model component 310 can train the prediction model with business data such as human resources data, best practices data, an employee handbook, training materials, historical data, employee account data, historical expenditure or expense reports, accounting data, other business data, and/or the like.

In some embodiments, the model component 310 can train the prediction model based on the business data associated with the business that employs the traveler. In some embodiments, the model component 310, via the machine learning technique, determines trends of the historical expense reports of other business employees as a training data set. The determination component 220 may train the prediction model via the machine learning technique.

The output component 320 can invoke or apply prediction model to present factors such as business, country, location, activity, and/or the like to determine a recommendation or likelihood based on the trends revealed by the machine learning and the historical data and/or the business data. In some embodiments, the output component 320 via the prediction model can determine an output as a ranked arrangement to be presented to the user 110 on the ATM. The output component 320 can suggest a withdrawal amount based on the likelihood that the user 110 will select the withdrawal amount. The output component 320 can present the withdrawal amount if the likelihood exceeds a threshold likelihood. For example, the determination component 220 can recommend a fast withdrawal button to be displayed to the user 110 on the ATM 120 if the likelihood that the user 110 wants the amount exceeds 60% or another predetermined threshold.

Figure 4:
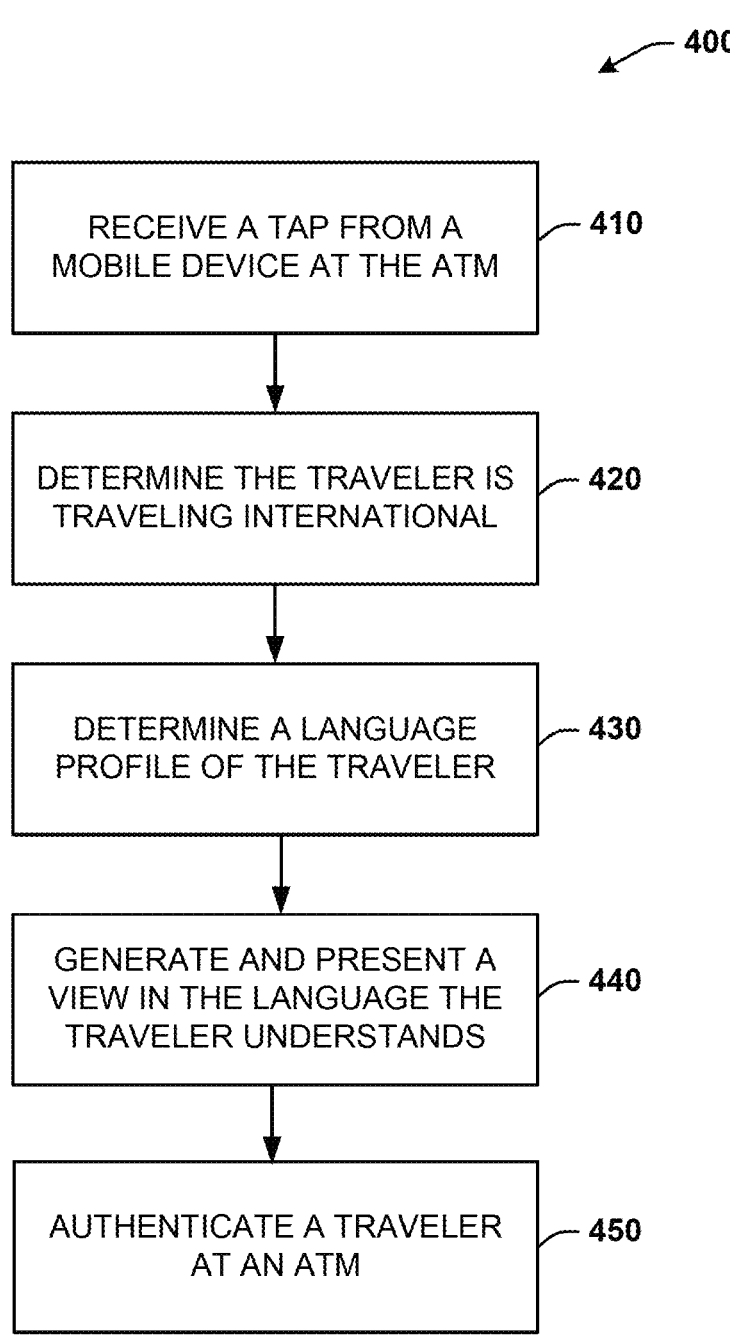
FIG. 4 illustrates an example component diagram of a model component, in accordance with one or more embodiments described herein.
Figure 5:
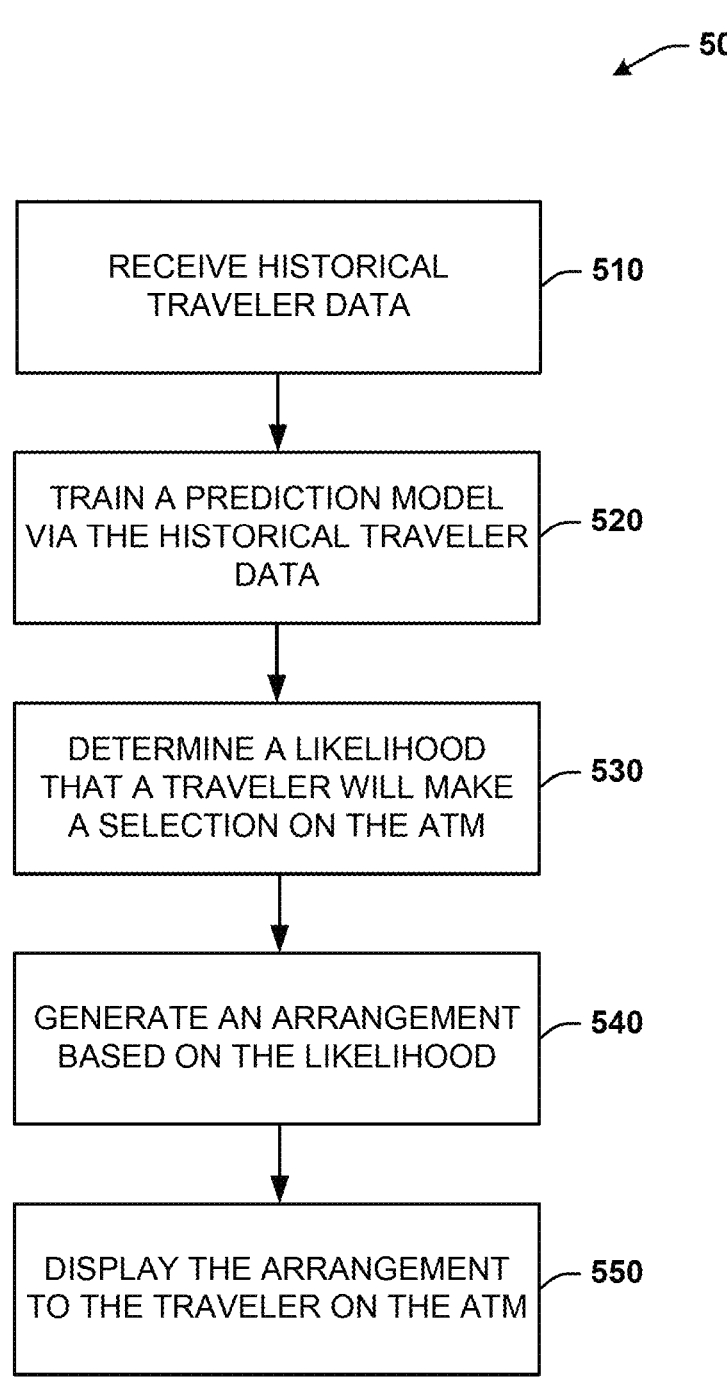
FIG. 5 illustrates another method for adaptable ATM displays for international travelers, in accordance with one or more embodiments described herein.

Regarding FIGS. 4 and 5, example methods 400 and 500 are depicted for adaptable ATM displays. While, for purposes of simplicity of explanation, the one or more methodologies are shown herein in the form of a flow chart shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure. It is also appreciated that the methods 400 and 500 are described in conjunction with a specific example for explanation purposes.

FIG. 4 illustrates method 400 for adaptable ATM displays for international travelers. At 410, a traveler can tap a mobile device at a particular location on an ATM. The ATM 120 can receive the tap that can initiate a transition to a customized or adaptable view to be presented to the user 110. In some examples, at 410, a system may receive an indication that a communication session is initiated, using near field communication (NFC), between the public terminal at a first location and a user device of a user in proximity of the public terminal.

At 420, a determination can be made that the traveler is traveling internationally. For example, a travel system 130 can determine that the user 110 is in a country in which the user 110 does not speak the local language by analyzing communications of the user 110 (e.g., a text message stating, "I will be in Spain on September $1^{st}$.") At 430, a language profile can be determined for the traveler. The travel system 130 can determine or receive a language the traveler understands. The travel system 130 can analyze correspondence to determine a language understood by the user 110. In some embodiments, the travel system 130 can receive a language preference in response to the tap of the mobile device of the user 110.

According to some examples, in response to receiving the indication (e.g., the indication that the communication session has been initiated between a user device and public terminal), the system may obtain historical transaction data of the user. As described herein, the historical transaction data may include (1) a plurality of transactions of the user, (2) a plurality of corresponding locations where the plurality of transactions occurred, and (3) a plurality of corresponding languages in which the plurality of transactions occurred. The system may determine, based on the historical transaction data, one or more frequent locations of the user where the user has conducted more than a threshold number of transactions and/or a language preference for the user in which the user has conducted a highest number of transactions (e.g., 410). The system may also determine (e.g., 420) whether the user of the user device is located within the one or more frequent locations of the user.

In some examples, rather than, or in addition to determining the language preference based on a language preference in which the user has conducted a highest number of transactions, the system may determine locations of public terminals at which the user has conducted the highest number of transactions and use a language associated with those locations. For example, the system may determine, from the historical transaction data of the user, one or more public terminals used by the user in previous transactions and determine a language associated with a location of the public terminal that the user uses with highest frequency.

In some cases, the system may determine that the language preference for the user in which the user has conducted the highest number of transactions is unavailable at the public terminal and determine an alternative language with which to alter a digital display of the public terminal.

At 440, a view in the language understood by the traveler can be generated and presented on the ATM. The travel system 130 can generate a view in the language understood by the user 110. The travel system 130 can translate a foreign language menu or view of the ATM 120 into the language understood by the user 110. In some embodiments, the travel system 130 can generate a customized view to be presented to the user 110 based on captured historical interactions of the user 110 with other ATMs.

For example, in response to determining that the user is not located within the one or more frequent locations of the user, the system may transmit a command to alter a digital display of the public terminal based on a user-specific configuration, wherein the user-specific configuration comprises the language preference of the user.

In some examples, rather than altering the language, one or more suggestions for actions may be altered. For example, the system may determine, based on the historical transaction data, one or more actions routinely performed at the public terminal by the user and may transmit a command to adaptively alter the digital display of the public terminal to suggest options for performing the one or more actions. In some examples, determining the one or more actions comprises determining, from the plurality of transactions of the user, one or more actions performed at the public terminal more than a threshold number of times during a time frame.

At 450, a traveler can authenticate themselves at an ATM. In one instance, the ATM can request a personal identification number (PIN) in the native or preferred language of the user 110. The personal identification number can be employed with input from a mobile device or a card to authenticate or validate the traveler's identity.

For example, the system may request, via the digital display of the public terminal in the user-specific configuration, user authentication data, such as a PIN or password. The system may receive, from the public terminal, the user authentication data received at the public terminal. The system may further compare the user authentication data with stored credentials of the user. In response to determining that the user authentication data matches the stored credentials of the user, the system may transmit an indication of a successful authentication of the user to the public terminal.

In response to the successful authentication, the public terminal may perform one or more actions for the user. The system may receive, e.g., from the public terminal, an indication of successful performance of an action at the public terminal by the user and transmit, to the user device, a notification indicating that the action has been completed. In response to an indication that the communication session has ended, the public terminal may be reconfigured. For example, the FIG. 5 illustrates another method 500 for adaptable ATM displays for international travelers. At 510, historical traveler data can be received. The travel system 130 can receive historical traveler data from a financial institution and/or a business at which the traveler is employed. The historical traveler data can be previous interactions with ATMs by the user 110. In some embodiments, the historical traveler data can be previous ATM interactions or withdrawals made by the user 110 and/or other employees of the business. In other embodiments, the historical traveler data can be other data such as business data, limits, account data, location data, travel data, or the like. At 520, a prediction model can be trained via the historical traveler data. The travel system 130 can train the prediction model via a machine learning technique and the historical traveler data as a training data set. The travel system 130 can train the prediction model with trends and/or correlations determined in the historical traveler data.

At 530, the likelihood that a traveler will make a selection on the ATM can be determined. The travel system 130 can invoke the prediction model to output a likelihood of a selection on the ATM that a traveler will make. The output can be a ranking of selections. For example, the ranking can affect actions completed by the user 110 at the ATM, such as one or more withdrawal amounts, a balance query, and a deposit in descending order of likelihood that a user 110 selections one of these actions. At 540, an arrangement can be generated based on the likelihood of selections or actions made by the traveler. The travel system 130 can generate an arrangement of buttons, selections, actions, and/or the like in a view. The travel system 130 customizes the view such that the most likely actions are prominently presented to the user 110 (e.g., the likely actions or selections are arranged to be at the top or before other actions). At 550, the arrangement can be displayed to the traveler on the ATM. The travel system 130 can provide the arrangement or view to the ATM 120 to be displayed and presented to the user 110. The user 110 can interact with the view to complete actions or make selections, such as withdrawing physical currency.

As used herein, the terms "component" and "system," as well as various forms thereof (e.g., components, systems, sub-systems), are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

Figure 6:
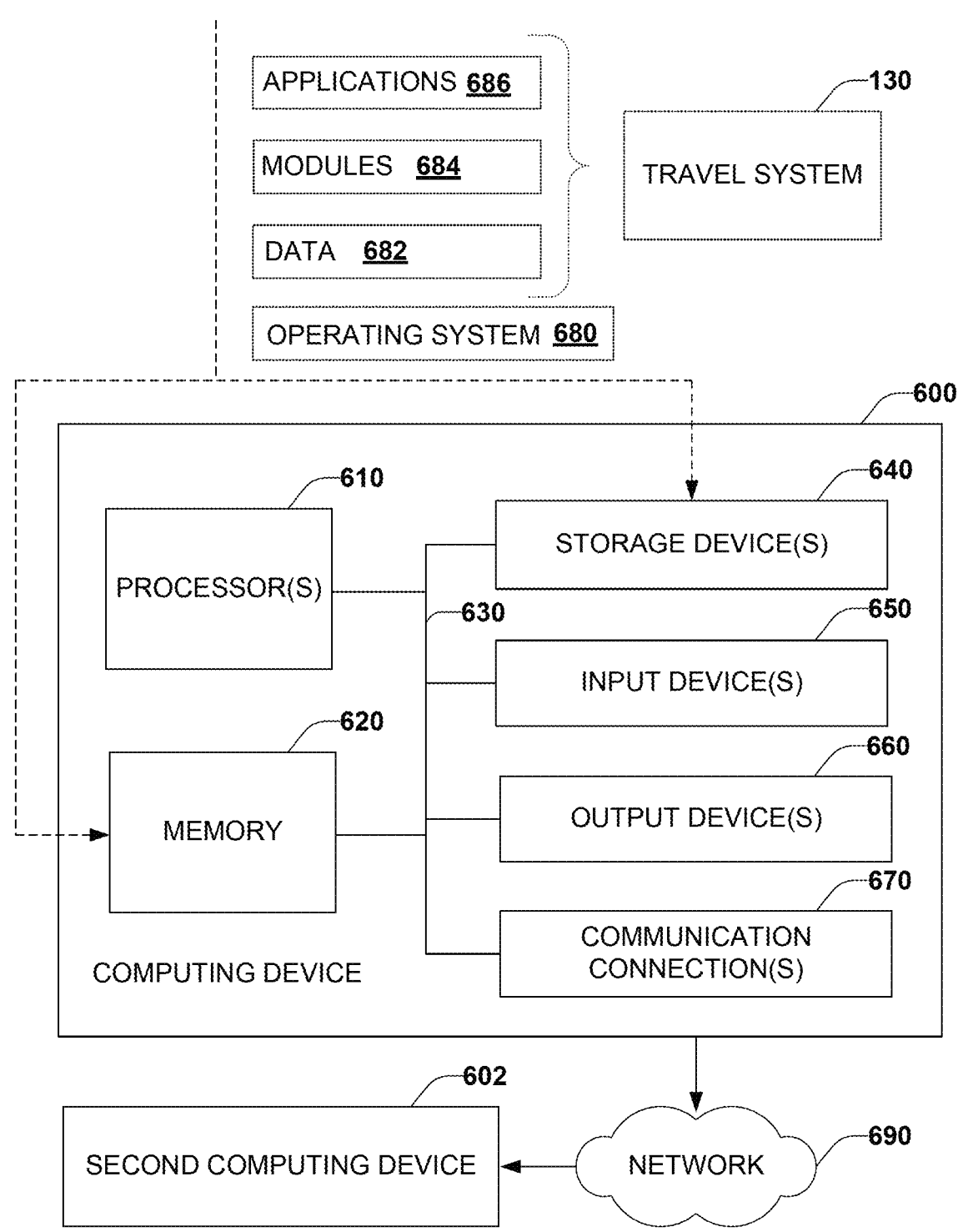
FIG. 6 illustrates a computing environment where one or more of the provisions set forth herein can be implemented, in accordance with one or more embodiments described herein.

To provide a context for the disclosed subject matter, FIG. 6, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all, aspects of the disclosed subject matter can be practiced on stand-alone computers. In a distributed computing environment, program modules may be located in one or both of local and remote memory devices.

With reference to FIG. 6, illustrated is an example computing device 600 (e.g., desktop, laptop, tablet, watch, server, hand-held, programmable consumer or industrial electronics, set-top box, game system, compute node, . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include processor(s) 610 coupled to memory 620, wherein the processor(s) 610 execute various computer-executable actions, instructions, and or components stored in the memory 620.

The processor(s) 610 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 610 can be a graphics processor unit (GPU) that performs calculations concerning digital image processing and computer graphics.

The computing device 600 can include or otherwise interact with a variety of computer-readable media to facilitate control of the computing device to implement one or more aspects of the disclosed subject matter. The computer-readable media can be any available media accessible to the computing device 600 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive), or any other like mediums that store, as opposed to transmit or communicate, the desired information accessible by the computing device 600. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 620 and storage device(s) 640 are examples of computer-readable storage media. Depending on the configuration and type of computing device, the memory 620 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 600, such as during start-up, can be stored in non-volatile memory, while volatile memory can act as external cache memory to facilitate processing by the processor(s) 610, among other things.

The storage device(s) 640 include removable/non-removable, volatile/non-volatile storage media for storing vast amounts of data relative to the memory 620. For example, storage device(s) 640 include, but are not limited to, one or more devices such as a magnetic or optical disk drive, floppy disk drive, flash memory, solid-state drive, or memory stick.

Memory 620 and storage device(s) 640 can include, or have stored therein, operating system 680, one or more applications 686, one or more program modules 684, and data 682. The operating system 680 acts to control and allocate resources of the computing device 600. One or more applications 686 include one or both of system and application software and can exploit management of resources by the operating system 680 through one or more program modules 684 and data 682 stored in the memory 620 and/or storage device(s) 640 to perform one or more actions. Accordingly, one or more applications 686 can turn a general-purpose computing device, e.g., computing device 600 into a specialized machine in accordance with the logic provided thereby.

All or portions of the disclosed subject matter can be implemented using standard programming and/or engineering techniques to produce software, firmware, hardware, or any combination thereof to control the computing device 600 to realize the disclosed functionality. By way of example and not limitation, all or portions of the travel system 130 can be, or form part of, the one or more applications 686, and include one or more program modules 684 and data 682 stored in memory and/or storage device(s) 640 whose functionality can be realized when executed by one or more processor(s) 610.

In accordance with one particular configuration, the processor(s) 610 can correspond to a system on a chip (SOC) or like architecture including, or in other words integrating, both hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the travel system 130 or associated functionality can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 650 and output device(s) 660 can be connected to the computing device 600 by way of wired connection (e.g., bus), wireless connection (e.g., Wi-Fi, Bluetooth), or a combination thereof.

The computing device 600 can also include communication connection(s) 670 to enable communication with at least a second computing device 602 utilizing a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. In one instance, the computing device 600 can execute a travel system 130 for a first function, and the second computing device 602 can execute a travel system 130 for a second function in a distributed processing environment. Further, the second computing device can provide a network-accessible service that stores source code and encryption keys, among other things, that can be employed by the travel system 130 executing on the computing device 600.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

A1. A method for adaptive configuration of a display language of a public terminal, comprising: receiving an indication that a communication session is initiated, using near field communication (NFC), between the public terminal at a first location and a user device of a user in proximity of the public terminal; in response to receiving the indication, obtaining historical transaction data of the user; determining, based on the historical transaction data, (1) one or more frequent locations of the user where the user has conducted more than a threshold number of transactions and (2) a language preference for the user in which the user has conducted a highest number of transactions; determining whether the user of the user device is located within the one or more frequent locations of the user; and in response to determining that the user is not located within the one or more frequent locations of the user, generating a command to alter a digital display of the public terminal based on a user-specific configuration, wherein the user-specific configuration comprises the language preference of the user.

A2. The method of any of the preceding embodiments, further comprising requesting, via the digital display of the public terminal in the user-specific configuration, user authentication data; receiving, from the public terminal, the user authentication data received at the public terminal; comparing the user authentication data with stored credentials of the user; and in response to determining that the user authentication data matches the stored credentials of the user, transmitting an indication of a successful authentication of the user to the public terminal.

A3. The method of any of the preceding embodiments, further comprising receiving an indication of successful performance of an action at the public terminal by the user; and transmitting, to the user device, a notification indicating that the action has been completed.

A4. The method of any of the preceding embodiments, wherein determining, based on the historical transaction data, the language preference for the user comprises: determining, from the historical transaction data of the user, one or more public terminals used by the user in previous transactions; and determining, a language associated with a location of the public terminal that the user uses with highest frequency.

A5. The method of any of the preceding embodiments, further comprising determining that the language preference for the user in which the user has conducted the highest number of transactions is unavailable at the public terminal; and determining an alternative language with which to alter a digital display of the public terminal.

A6. The method of any of the preceding embodiments, further comprising determining, based on the historical transaction data, one or more actions routinely performed at the public terminal by the user; and transmitting a command to adaptively alter the digital display of the public terminal to suggest options for performing the one or more actions.

A7. The method of any of the preceding embodiments, wherein the historical transaction data includes (1) a plurality of transactions of the user, (2) a plurality of corresponding locations where the plurality of transactions occurred, and (3) a plurality of corresponding languages in which the plurality of transactions occurred, and wherein determining the one or more actions comprises determining, from the plurality of transactions of the user, one or more actions performed at the public terminal more than a threshold number of times during a time frame.

A8. The method of any of the preceding embodiments, further comprising in response to an indication that the communication session has ended, reconfiguring the public terminal.

A9. One or more tangible, non-transitory, computer-readable media storing instructions that, when executed by a data processing apparatus, cause the data processing apparatus to perform operations comprising those of any of embodiments A1-A8.

A10. A system comprising: one or more processors; and memory storing instructions that, when executed by the one or more processors, cause the processors to effectuate operations comprising those of any of embodiments A1-A8.

A11. A system comprising means for performing any of embodiments A1-A8.

A12. A system comprising cloud-based circuitry for performing any of embodiments A1-A8.

B1. A method, comprising: receiving a mobile device input from a mobile device associated with a traveler; determining the traveler is outside their country of residence, wherein the determining comprises: mining data associated with the traveler from one or more data sources; and determining a likelihood that the traveler is outside their country of residence based on the data; altering a digital display of an automated teller machine (ATM) based on the mobile device input, wherein the digital display is changed according to a language setting; requesting a personal identification number; and authenticating the traveler based on the mobile device input and the personal identification number.

B2. The method of any of the preceding embodiments, further comprising: altering the digital display to present currency of the country of residence; and converting a specified value in the currency of the country of residence to local currency.

B3. The method of any of the preceding embodiments, further comprising mining data from at least one of a calendar entry, location data of the mobile device, or a travel itinerary.

B4. The method of any of the preceding embodiments, further comprising: training a business rule model based on historical transaction data associated with a business that employs the traveler; and invoking the business rule model to determine the digital display of the ATM based on the business rule model.

B5. The method of any of the preceding embodiments, wherein the business rule model outputs a per diem business rule.

B6. The method of any of the preceding embodiments, further comprising altering the digital display of the ATM to suggest a withdrawal amount based on the per diem business rule.

B7. The method of any of the preceding embodiments, wherein the mobile device input is a wireless tap received at a specified location on the ATM.

B8. The method of any of the preceding embodiments, further comprising: determining a ranking of actions that can be completed at the ATM by the traveler; and altering an arrangement of the digital display according to the ranking of actions.

B9. A system, comprising: a processor coupled to a memory that includes instructions that, when executed by the processor, cause the processor to: invoke a business rule model on mobile device input associated with a traveler to determine a view of a digital display of an automated teller machine (ATM), wherein the business rule model is trained with historical transaction data associated with a business that employs the traveler; alter the digital display of the ATM to the view based on the mobile device input, wherein the view corresponds to a change to a preselected language setting; request a personal identification number from the traveler; and authenticate the traveler based on the mobile device input and the personal identification number.

B10. The system of any of the preceding embodiments, wherein the instructions further cause the processor to determine the traveler is outside their country of residence.

B11. The system of any of the preceding embodiments, wherein the instructions further cause the processor to: mine data associated with the traveler from one or more data sources; and determine a likelihood that the traveler is outside their country of residence based on the data.

B12. The system of any of the preceding embodiments, wherein the one or more data sources includes at least one of a calendar entry, location data of the mobile device, or a travel itinerary.

B13. The system of any of the preceding embodiments, wherein the instructions further cause the processor to train the business rule model based on one or more trends in historical transaction data provided as training data.

B14. The system of any of the preceding embodiments, wherein the business rule model outputs a per diem business rule.

B15. The system of any of the preceding embodiments, wherein the instructions further cause the processor to alter the digital display of the ATM to suggest a withdrawal amount based on the per diem business rule.

B16. The system of any of the preceding embodiments, wherein the mobile device input is a wireless tap received at a specified location on the ATM.

B17. The system of any of the preceding embodiments, wherein the instructions further cause the processor to: determine a ranking of actions that can be completed at the ATM by the traveler; and alter an arrangement of the digital display according to the ranking of actions.

B18. A computer-implemented method, comprising: receiving a mobile device input from a mobile device associated with a traveler; determining the traveler is in a country in which the traveler speaks a different language; generating a view of a digital display of an automated teller machine based on the mobile device input, wherein the view is changed to the different language associated with the traveler; requesting a personal identification number in the different language; and authenticating the traveler based on the mobile device input and the personal identification number.

B19. The computer-implemented method of any of the preceding embodiments, further comprising analyzing correspondence to determine the different language of the traveler.

B20. The computer-implemented method of any of the preceding embodiments, further comprising altering the view according to business rules associated with a business that employs the traveler.

What is claimed is:

1. A system for adaptive configuration, the system comprising:

one or more processors; and one or more non-transitory, computer-readable media comprising instructions that, when executed by the one or more processors, causes operations comprising:

receiving an indication that a communication session is initiated, using near field communication (NFC), between a public terminal at a first location and a user device of a user in proximity of the public terminal, wherein the public terminal is outside of a country of residence of the user;

in response to receiving the indication, obtaining historical transaction data of the user including (1) a plurality of transactions of the user, (2) a plurality of corresponding locations where the plurality of transactions occurred, and (3) a plurality of corresponding languages in which the plurality of transactions occurred;

determining, based on the historical transaction data, a language associated with a location of a different public terminal that the user uses with highest frequency, wherein the plurality of corresponding locations include the location of the different public terminal, and wherein the plurality of corresponding languages include the language associated with the location of the different public terminal;

transmitting a command to alter a digital display of the public terminal to the language associated with the location of the different public terminal; and transmitting a command to display, via the digital display of the public terminal, a request for user authentication data configured in a user-specific configuration.

2. The system of claim 1, wherein the instructions cause the one or more processors to perform operations comprising:

receiving, from the public terminal, the user authentication data received at the public terminal;

comparing the user authentication data with stored credentials of the user; and in response to determining that the user authentication data matches the stored credentials of the user, transmitting an indication of a successful authentication of the user to the public terminal.

3. The system of claim 1, wherein determining, based on the historical transaction data, a language preference for the user comprises:

determining, from the historical transaction data, one or more languages used in previous digital displays used by the user at a plurality of public terminals; and determining a language used with a highest frequency in the previous digital displays used by the user.

4. The system of claim 1, wherein the instructions cause the one or more processors to perform operations comprising:

determining that the user has selected an alternative language different from the language; and updating, based on determining that the user has selected the alternative language, the historical transaction data.

5. A method for adaptive configuration of a display language of a public terminal, comprising:

receiving an indication that a communication session is initiated, using near field communication (NFC), between the public terminal at a first location and a user device of a user in proximity of the public terminal, wherein the public terminal is outside of a country of residence of the user;

in response to receiving the indication, obtaining historical transaction data of the user including (1) a plurality of transactions of the user, (2) a plurality of corresponding locations where the plurality of transactions occurred, and (3) a plurality of corresponding languages in which the plurality of transactions occurred;

determining, based on the historical transaction data, a language associated with a location of a different public terminal that the user uses with highest frequency, wherein the plurality of corresponding locations include the location of the different public terminal, and wherein the plurality of corresponding languages include the language associated with the location of the different public terminal; and generating a command to alter a digital display of the public terminal to the language associated with the location of the different public terminal.

6. The method of claim 5, further comprising:

requesting, via the digital display of the public terminal, user authentication data;

receiving, from the public terminal, the user authentication data received at the public terminal;

comparing the user authentication data with stored credentials of the user; and in response to determining that the user authentication data matches the stored credentials of the user, transmitting an indication of a successful authentication of the user to the public terminal.

7. The method of claim 6, further comprising:

receiving an indication of successful performance of an action at the public terminal by the user; and transmitting, to the user device, a notification indicating that the action has been completed.

8. The method of claim 5, further comprising:

determining that the language is unavailable at the public terminal; and determining an alternative language with which to alter a digital display of the public terminal.

9. The method of claim 5, further comprising:

determining, based on the historical transaction data, one or more actions routinely performed at the public terminal by the user; and transmitting a command to adaptively alter the digital display of the public terminal to suggest options for performing the one or more actions.

10. The method of claim 9, wherein determining the one or more actions comprises determining, from the plurality of transactions of the user, one or more actions performed at the public terminal more than a threshold number of times during a time frame.

11. The method of claim 5, further comprising:

in response to an indication that the communication session has ended, reconfiguring the public terminal.

12. The method of claim 5, further comprising:

determining that the user has selected an alternative language different from the language; and updating, based on determining that the user has selected the alternative language, the historical transaction data.

13. One or more non-transitory, computer-readable media storing instructions that, when executed by one or more processors, cause the one or more processors to perform operations comprising:

receiving an indication that a communication session is initiated, using wireless communication between a public terminal at a first location and a user device of a user in proximity of the public terminal, wherein the public terminal is outside of a country of residence of the user;

in response to receiving the indication, obtaining historical transaction data of the user including (1) a plurality of transactions of the user, (2) a plurality of corresponding locations where the plurality of transactions occurred, and (3) a plurality of corresponding languages in which the plurality of transactions occurred;

determining, based on the historical transaction data, a language associated with a location of a different public terminal that the user uses with highest frequency, wherein the plurality of corresponding locations include the location of the different public terminal, and wherein the plurality of corresponding languages include the language associated with the location of the different public terminal; and generating a command to alter a digital display of the public terminal to the language associated with the location of the different public terminal.

14. The one or more non-transitory, computer-readable media of claim 13, wherein the instructions cause the one or more processors to perform operations comprising:

requesting, via the digital display of the public terminal in a user-specific configuration, user authentication data;

receiving, from the public terminal, the user authentication data received at the public terminal;

comparing the user authentication data with stored credentials of the user; and in response to determining that the user authentication data matches the stored credentials of the user, transmitting an indication of a successful authentication of the user to the public terminal.

15. The one or more non-transitory, computer-readable media of claim 14, wherein the instructions cause the one or more processors to perform operations comprising:

receiving an indication of successful performance of an action at the public terminal by the user; and transmitting, to the user device, a notification indicating that the action has been completed.

16. The one or more non-transitory, computer-readable media of claim 13, wherein the instructions cause the one or more processors to perform operations comprising:

determining that the language is unavailable at the public terminal; and determining an alternative language with which to alter a digital display of the public terminal.

17. The one or more non-transitory, computer-readable media of claim 13, wherein the instructions cause the one or more processors to perform operations comprising:

determining, based on the historical transaction data, one or more actions routinely performed at the public terminal by the user; and transmitting a command to adaptively alter the digital display of the public terminal to suggest options for performing the one or more actions.

18. The one or more non-transitory, computer-readable media of claim 17, wherein determining the one or more actions comprises determining, from the plurality of transactions of the user, one or more actions performed at the public terminal more than a threshold number of times during a time frame.

19. The one or more non-transitory, computer-readable media of claim 13, wherein the instructions cause the one or more processors to perform operations comprising:

in response to an indication that the communication session has ended, reconfiguring the public terminal.

20. The one or more non-transitory, computer-readable media of claim 13, wherein the instructions cause the one or more processors to perform operations comprising:

determining that the user has selected an alternative language different from the language; and updating, based on determining that the user has selected the alternative language, the historical transaction data.

* * * * *